United States Patent
Yoshizawa

(10) Patent No.: US 9,146,667 B2
(45) Date of Patent: Sep. 29, 2015

(54) ELECTRONIC DEVICE, DISPLAY SYSTEM, AND METHOD OF DISPLAYING A DISPLAY SCREEN OF THE ELECTRONIC DEVICE

(75) Inventor: Hiroaki Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 66 days.

(21) Appl. No.: 13/614,169

(22) Filed: Sep. 13, 2012

(65) Prior Publication Data

US 2013/0082953 A1    Apr. 4, 2013

(30) Foreign Application Priority Data

Sep. 29, 2011    (JP) ................................ 2011-214613

(51) Int. Cl.
G06F 3/041    (2006.01)
G06F 3/0488    (2013.01)

(52) U.S. Cl.
CPC .................................... G06F 3/0488 (2013.01)

(58) Field of Classification Search
CPC .................................................... G06F 3/0481
USPC ............ 353/122; 345/173, 2.2; 715/784, 863, 715/835
See application file for complete search history.

(56) References Cited

U.S. PATENT DOCUMENTS

| | | | | |
|---|---|---|---|---|
| 5,428,417 A | * | 6/1995 | Lichtenstein | ................. 353/122 |
| 7,239,305 B1 | * | 7/2007 | Nakano et al. | ................. 345/173 |
| 2010/0105428 A1 | | 4/2010 | Kim | |
| 2011/0252375 A1 | * | 10/2011 | Chaudhri | ....................... 715/835 |
| 2012/0054671 A1 | * | 3/2012 | Thompson et al. | ........... 715/863 |

FOREIGN PATENT DOCUMENTS

| | | |
|---|---|---|
| CN | 101211240 | 7/2008 |
| CN | 101729629 | 6/2010 |
| JP | 63-40190 | 2/1988 |
| JP | 09-297656 | 11/1997 |
| JP | 2001-117697 | 4/2001 |
| JP | 2007-080005 | 3/2007 |

OTHER PUBLICATIONS

Notification of the First Office Action for Chinese Patent Application No. 201210374692.7 Dated Apr. 29, 2015, 34 pages.
First Office Action for Japanese Patent Application No. 2011-214613 dated Jun. 30, 2015, 25 pages.

* cited by examiner

*Primary Examiner* — Kevin Nguyen
(74) *Attorney, Agent, or Firm* — Amin, Turocy & Watson, LLP

(57) ABSTRACT

When a touch operation on a touch-panel display module of an electronic device has been detected, a display entity corresponding to the touched object is created. The display entity is superimposed on the touched position on a display screen. A projector, an external display device, projects the display entity onto a screen. Even when the display screen of the electronic device has been moved by a touch operation, the audience looking at a screen page displayed on the screen can see the touch position in the form of the display entity, making it possible to understand the meaning of the operator's touch operation.

8 Claims, 8 Drawing Sheets

ELECTRONIC DEVICE, DISPLAY SYSTEM, AND METHOD OF DISPLAYING A DISPLAY SCREEN OF THE ELECTRONIC DEVICE

CROSS-REFERENCE TO RELATED APPLICATIONS

This application is based upon and claims the benefit of priority from prior Japanese Patent Application No. 2011-214613, filed Sep. 29, 2011, the entire contents of which are incorporated herein by reference.

BACKGROUND OF THE INVENTION

1. Field of the Invention

Embodiments described herein relate generally to an electronic device with a touch-panel display module, a display system that displays the contents of the screen of the electronic device by means of an external display device, and a method of displaying the screen of the electronic device.

2. Description of the Related Art

In recent years, mobile devices with touch-panel display modules have rapidly become popular. Previously, to give a presentation, a user generally connected a notebook computer to a projector in order to show content stored in the computer on a screen. Recently, however, touch-panel mobile devices (for example, tablet computers) are being increasingly used in place of notebook computers.

When the notebook computer is connected to a projector and display data in the notebook computer is projected onto a screen, a mouse pointer responding to the operation of the presenter is also displayed on the screen. Therefore, the audience can understand the operation position of the presenter in real time and therefore easily understand what the presenter means.

However, when the touch-panel mobile device is used, a mouse pointer or the like corresponding to user operation is not displayed on the display screen. Accordingly, when the display of the mobile device has changed as a result of the presenter's touch operation, the display screen projected by the projector also changes suddenly. Therefore, this causes a problem: the audience looking at the screen cannot understand the presenter's operation, making it difficult to understand what the presenter means.

When a presentation is given using a projector, it is desired that the audience can understand the contents of the presenter's operation easily.

To assist the presenter's explanation in a presentation system, a handwritten input display device has been considered which combines a handwritten image with the displayed contents, displays the combined handwritten image, and automatically deletes the combined image after a set time has elapsed or in response to a button press action (for example, Jpn. Pat. Appln. KOKAI Publication No. 2007-080005).

BRIEF SUMMARY OF THE INVENTION

It is an object of the invention to provide an electronic device and a display system which enable the position of a touch operation to be displayed properly according to a display object to be operated when an external display device, such as a projector, displays a display screen of a touch-panel electronic device.

According to an embodiment of the invention, there is provided an electronic device comprising: a display module with a touch-panel; a touch object determination module which determines a display object displayed in a touch position when a touch has been detected at the touch-panel; a touch position combination module which combines a display entity in a form corresponding to the display object determined by the touch object determination module with display screen data so as to display the display entity in the touched position; and a display data output module which outputs, to an external display device, display screen data with which the display entity representing the touch position has been combined by the touch position combination module.

According to another embodiment of the invention, there is provided a display system comprising an electronic device including a display module with a touch-panel and an external display device, the electronic device comprising a display data output module which outputs display screen data currently displayed on the display module to the external display device, a touch object determination module which determines a display object displayed in a touch position when the position of a touch operation has been detected at the touch-panel, and a touch information output module which outputs, to the external display device, position information on the touch detected at the touch-panel and information on the display object displayed in the touch position determined by the touch object determination module, and the external display device comprising a display module which displays display screen data received from the electronic device, and a touch position combination module which combines a display entity representing a touch position with display screen data currently displayed on the display module in a display form corresponding to the display object based on position information on the touch operation received from the electronic device and information on a display object corresponding to the position of the touch operation.

According to still another embodiment of the invention, there is provided a method of displaying a display screen of an electronic device including a display module with a touch-panel by means of an external display device, the method comprising: determining a display object displayed in a touch position when a touch has been detected at the touch-panel of the electronic device; combining a display entity in a form corresponding to the determined display object with display screen data so as to display the display entity in the touched position; and causing the external display device to display screen data with which the display entity representing the touch position has been combined.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, embodiments of the invention will be explained.

Figure 1:
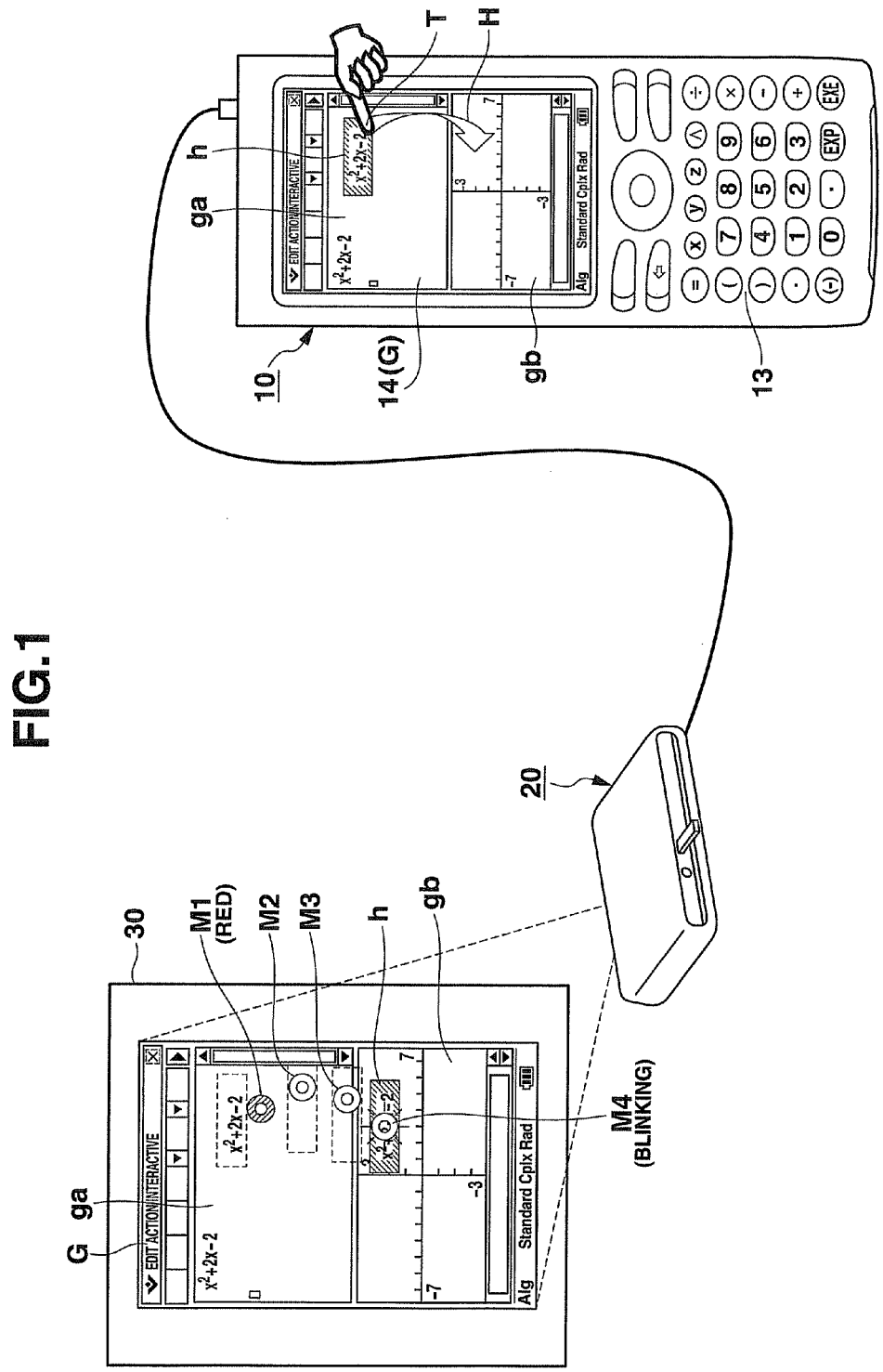
FIG. 1 is a diagram showing an appearance configuration of a projector display system using a touch-panel graph function electronic calculator 10 according to an embodiment of the invention.

FIG. 1 is a diagram showing an appearance configuration of a display system using a touch-panel graph function electronic calculator 10 according to an embodiment of the invention.

In the display system of the embodiment, a touch-panel graph function electronic calculator 10 operated by a teacher is connected to a projector 20 in, for example, the classroom. The students study, while looking at a calculator screen G projected onto a screen 30 by the projector 20. Instead of the projector 20, an external display device, such as a large liquid-crystal display device, can be used. Hereinafter, an explanation will be given, taking as an example a case where a projector is used as an external display device.

In FIG. 1, on the touch-panel display module 14 of the graph function electronic calculator 10, a calculator screen G composed of an expression input area ga and a graph display area gb is displayed. Display data on the calculator screen G is output to the projector 20, which projects the display data onto the screen 30.

The projector display system has the function of displaying a touch position pointer or its movement locus pointer according to the position touched by the teacher or its movement locus on the touch-panel display module 14 of the graph function electronic calculator 10.

For example, the following is an explanation of a case where the expression $x^2+2x-2$ input to the expression input area ga is dragged and dropped in the graph display area gb, thereby giving a graph representation.

When the expression $x^2+2x-2$ in the expression input area ga has been subjected to a touch operation T and is highlighted in reverse display h, a first touch position pointer M1 is displayed in red on the screen 30 according to the coordinates of the touch position detected at the touch-panel display module 14. Then, when the expression $x^2+2x-2$ highlighted in reverse display by the touch operation T has been dragged to the graph display area gb, movement locus pointers M2, M3, M4 corresponding to its movement locus H are displayed on the screen 30 sequentially. At this time, movement locus pointer M4 corresponding to the latest touch position is displayed so as to be identified by being blinked. Then, when the dragged expression $x^2+2x-2$ has been dropped in the graph display area gb, after the series of movement locus pointers M1 to M4 are displayed for a specific time, they are deleted and a graph corresponding to the dropped expression $x^2+2x-2$ is displayed.

This enables even a student looking at the calculator screen G projected onto the screen 30 to clearly understand the contents of the teacher's touch operation on the calculator screen G (touch-panel display module 14) of the graph function electronic calculator 10 and to easily understand what the teacher has meant.

The function of displaying touch position pointer M1 corresponding to the touch operation T on the graph function electronic calculator 10 or movement locus pointers M1 to Mn on the calculator screen G projected by the projector 20 and other functions may be provided to a single unit of the graph function electronic calculator 10 as explained later in a first embodiment or to the whole of the projector display system (or the graph function electronic calculator 10 and projector 20) as explained later in a second embodiment.

First Embodiment

Figure 2:
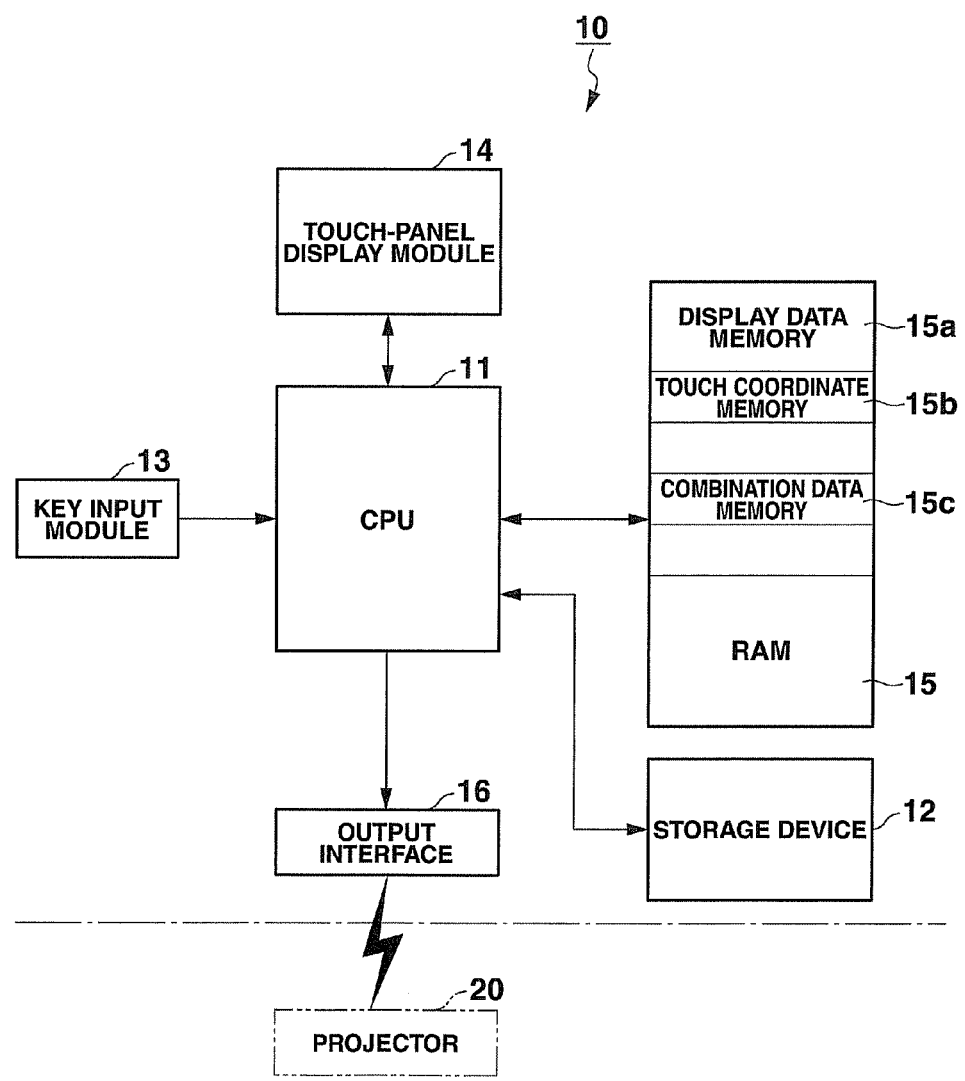
FIG. 2 is a block diagram showing a configuration of the electronic circuitry of the touch-panel graph function electronic calculator 10 used as a teacher's device of the projector display system.

FIG. 2 is a block diagram showing a configuration of the electronic circuitry of the touch-panel graph function electronic calculator 10 used as a teacher's device of the projector display system.

The graph function electronic calculator 10 includes a CPU 11, a computer.

The CPU 11 controls the operation of various parts of the circuitry according to a key input signal from a key input module 13 or a touch position detection signal from a touch-panel display module 14 on the basis of a calculator control program preliminarily stored in a storage device 12, such as a flash ROM, or of a calculator control program read from the outside.

A RAM 15 functioning as a working memory is connected to the CPU 11. Working data corresponding to a control operation of the CPU 11 is stored temporarily in the CPU 11 as needed.

The RAM 15 includes not only a display data memory 15a, a touch coordinate data memory 15b, a combination data memory 15c but also an input expression data memory, a calculation data memory, a graph data memory, a table data memory, and a graphic data memory (which are not shown).

In the display data memory 15a, display data to be displayed on the touch-panel display module 14 is developed into bitmap data and stored.

In the touch coordinate data memory 15b, coordinate data corresponding to the position of a touch operation T detected on the touch-panel display module 14 is stored.

In the combination data memory 15c, a memory area of the same size as that of the display data memory 15a is secured. Data on a display entity, such as a touch position pointer M1, to be combined with display data on the calculator screen G stored in the display data memory 15a is developed into bitmap data and stored in the combination data memory 15c.

An output interface 16 is connected to the CPU 11. Display data on the calculator screen G stored in the display data memory 15a or display data on the calculator screen G combined with a display entity, such as a pointer, stored in the combination data memory 15c is output from the output interface 16 to the projector 20.

In the projector display system of the first embodiment, the projector 20 does not have a special function and projects directly onto the screen 30, display data on the calculator screen G output from the output interface 16 of the graph function electronic calculator 10.

Next, an operation of the projector display system using the touch-panel graph function electronic calculator 10 configured as described above will be explained.

Figure 3:
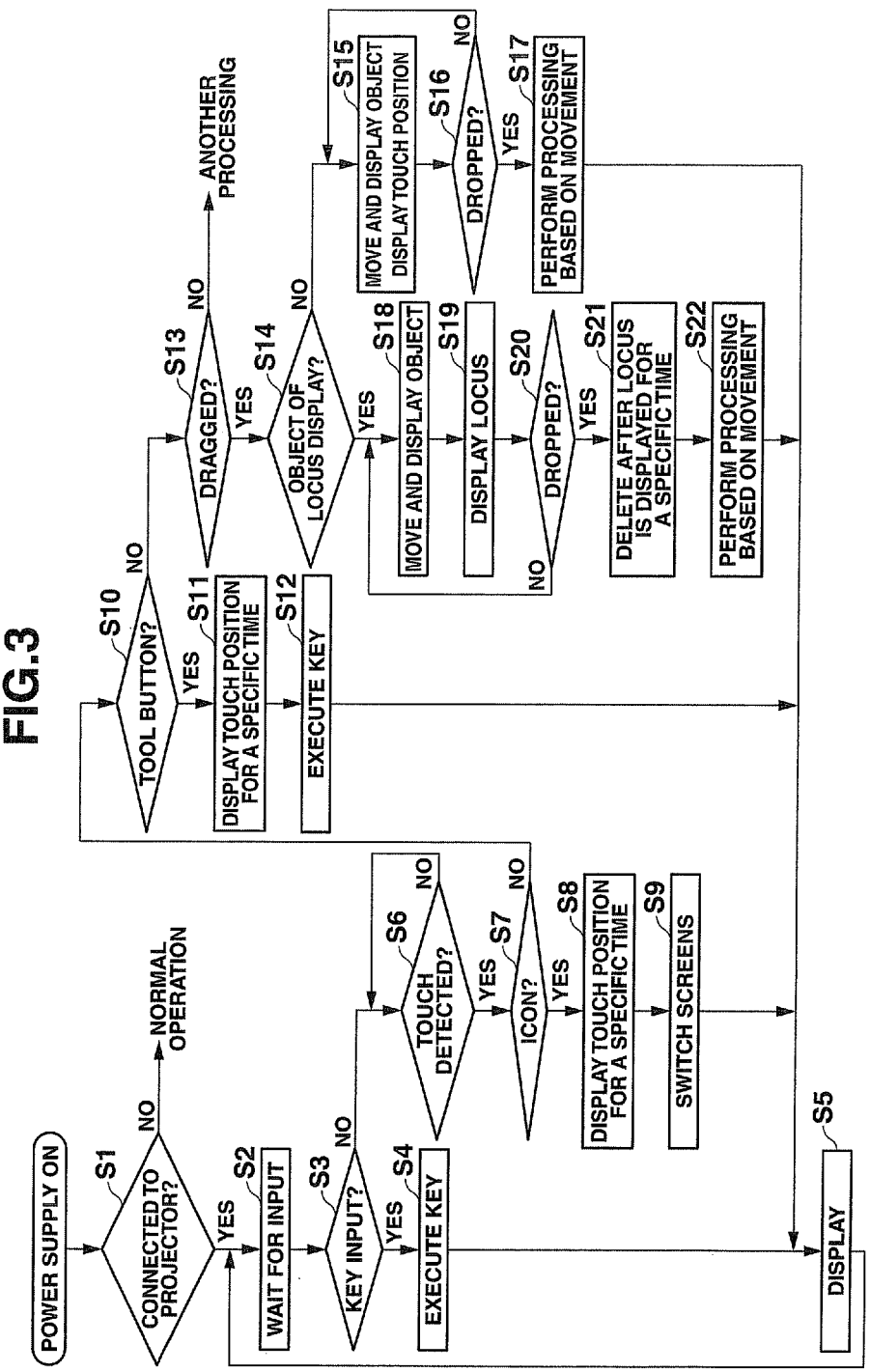
FIG. 3 is a flowchart to explain calculator processing of a first embodiment performed by the touch-panel graph function electronic calculator 10.

FIG. 3 is a flowchart to explain calculator processing of the first embodiment performed by the graph function electronic calculator 10.

When the power supply of the graph function electronic calculator 10 is turned on, it is determined whether the graph function electronic calculator 10 is connected to the projector 20 (step S1). If graph function electronic calculator 10 is not connected to the projector 20 (No in step S1), the graph function electronic calculator 10 performs a normal operation in a stand-alone mode. In contrast, if it has been determined that the graph function electronic calculator 10 is connected to the projector 20 (Yes in step S1), the graph function electronic calculator 10 goes into an input waiting state, waiting for a user operation on a key input module 13 or on the touch-panel display module 14 (step S2).

Here, if a key is input on the key input module 13 (Yes in step S3), an operation corresponding to the input key is performed, creating display data to display the result (step S4) and displaying the display data on the touch-panel display module 14 (step S5). The display data is output from the output interface 16 to the projector 20, which projects the data onto the screen 30.

That is, for example, when a mathematical expression is key input, a calculator screen G that displays the key-input mathematical expression is output.

If it has been determined that the touch-panel display module 14 has been touched, it is determined which display object of the displayed icons, toolbar, figures, and others has been touched and a process corresponding to the type of the touched object is performed.

Figure 4:
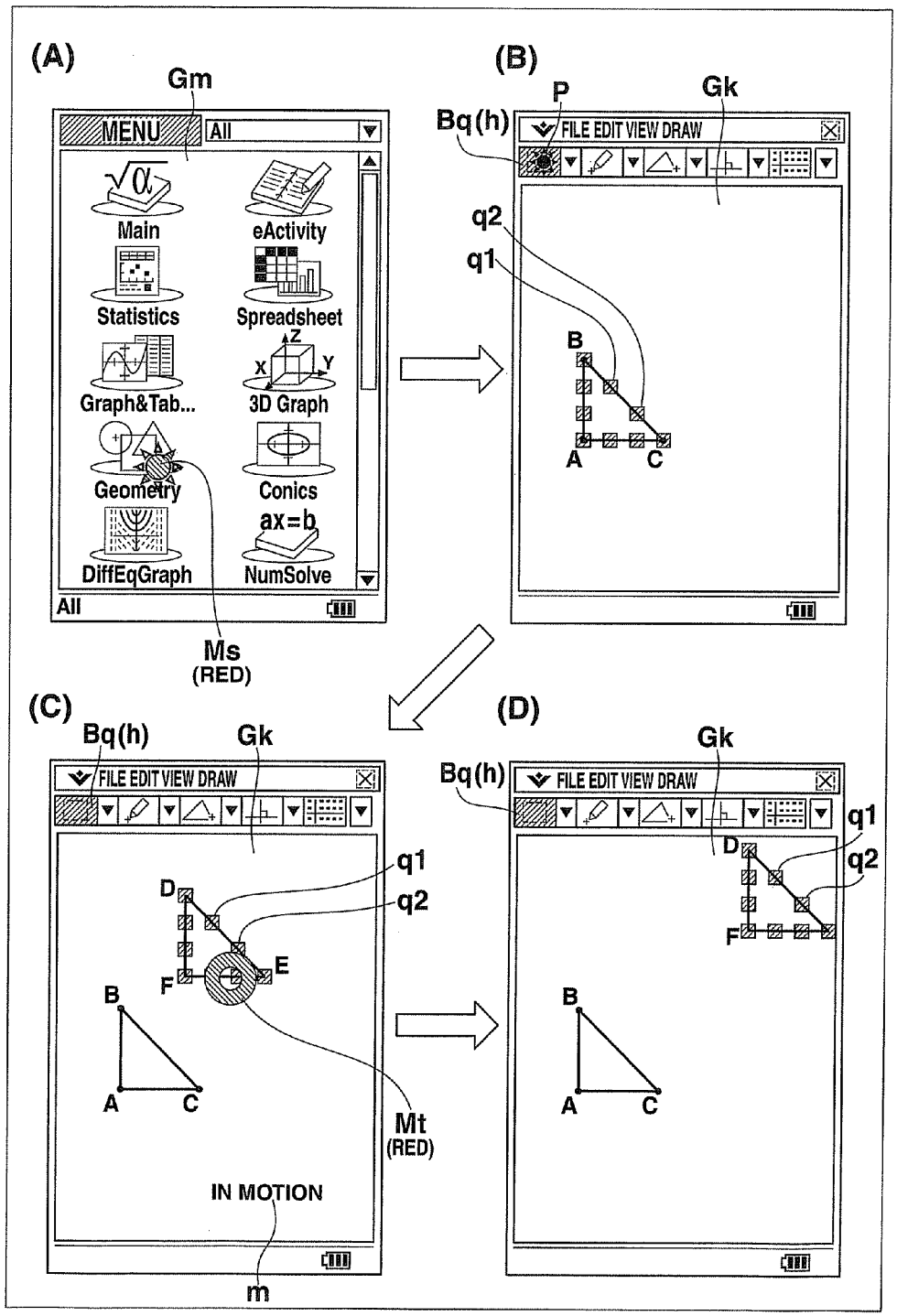
FIG. 4 shows projector display operations (concrete example 1) of a calculator screen G corresponding to a touch operation on the touch-panel graph function electronic calculator 10.

FIG. 4 shows projector display operations (concrete example 1) of the calculator screen G corresponding to a touch operation on the touch-panel graph function electronic calculator 10.

As shown in FIG. 4(A), with a calculator menu screen Gm being displayed on the touch-panel display module 14 (step S2), if an arbitrary icon (for example, the icon "Geometry" of a graphic processing application) has been touched, the touch is detected (Yes in step S6) and then it is determined whether an icon has been touched (step S7). If it has been determined that an icon has been touched (Yes in step S7), a touch position pointer Ms is written in the combination data memory 15*c* according to coordinate data on the touch position and superimposed on the touch position of the graphic processing icon "Geometry" on the calculator menu screen Gm, and the resulting screen is displayed for a specific time (step S8). At this time, the touch position pointer Ms is displayed in such a manner that a display entity in a shape as shown in FIG. 4(A) is identified in red.

Then, after the touch position pointer Ms has been displayed on the calculator menu screen Gm for the specific time, the graphic processing application is activated according to the operation of the graphic processing icon "Geometry," a graphic processing screen Gk is developed in the display data memory 15*a* in place of the calculator menu screen Gm (step S9), and is displayed on the touch-panel display module 14 (step S5). The display screen is output to the projector 20, which projects the display screen onto the screen 30.

As a result, even a student looking at the calculator menu screen Gm projected onto the screen 30 can clearly understand that the icon touched by the teacher is the graphic processing icon "Geometry" because the touch position pointer Ms is displayed on the screen and then surely understand what the teacher means when the screen is changed to the graphic processing screen Gk.

Next, suppose the graphic processing application has drawn a triangle ABC according to a teacher's operation as shown in FIG. 4(B). To copy the triangle, the teacher touches a figure selection button Bq in the tool buttons of a toolbar arranged along the top of the screen Gk.

Then, it has been determined that a tool button has been operated (step S2→step S6→Yes in step S10). Then, as shown in FIG. 4(B), not only is the figure selection button Bq highlighted in reverse display h, but also the touch position pointer P is written in the combination data memory 15*c* according to coordinate data on the position of the touch operation, is combined with the touch position of the figure selection button Bq, and is displayed for a specific time (step S11). At this time, the touch position pointer P is displayed in such a manner that a display entity as shown in FIG. 4(B) is identified in red.

Then, after the touch position pointer P has been displayed for the specific time in the touch position of the figure selection button Bq, an operation corresponding to the figure selection button Bq is performed and the individual sides of triangle ABC displayed on the graphic processing screen Gk are displayed in such a manner that the individual sides of triangle ABC are attached with selection marks q1, q2, . . . , respectively (steps S12, S5).

As a result, even a student looking at the graphic processing screen Gk displayed on the screen 30 by the projector 20 can clearly understand that the tool button touched by the teacher is the figure selection button Bq and then surely understand what the teacher means when selection marks q1, q2, . . . , are attached to displayed triangle ABC.

When triangle ABC attached with selection marks q1, q2, . . . , is copied on the graphic processing screen Gk, if selected triangle ABC is touched and dragged (step S2 and Yes in step S13), it is determined whether the dragged object requires locus display (step S14). In the first embodiment, "mathematical expression" is an object of locus display.

If it has been determined that triangle ABC to be dragged is not an object of locus display (No in step S14), a copied triangle DEF is moved and displayed according to the coordinates of the touch position sequentially updated and detected in response to a drag operation as shown in FIG. 4(C) and the touch position pointer Mt is combined with the triangle, moved, and displayed in real time (step S15).

At this time, the message "In motion" m is displayed on the graphic processing screen Gk and the touch position pointer Mt is displayed in such a manner that a display entity shown in FIG. 4(C) is identified in red.

After this, as shown in FIG. 4(D), when copied and dragged triangle DEF is dropped (Yes in step S16), the touch position pointer Mt is deleted and the copied triangle DEF is displayed in the drop position (steps S17, S5).

As a result, even a student looking at the graphic processing screen Gk projected onto the screen 30 by the projector 20 can clearly understand how triangle DEF copied after the teacher has touched selected triangle ABC is dragged.

Figure 5:
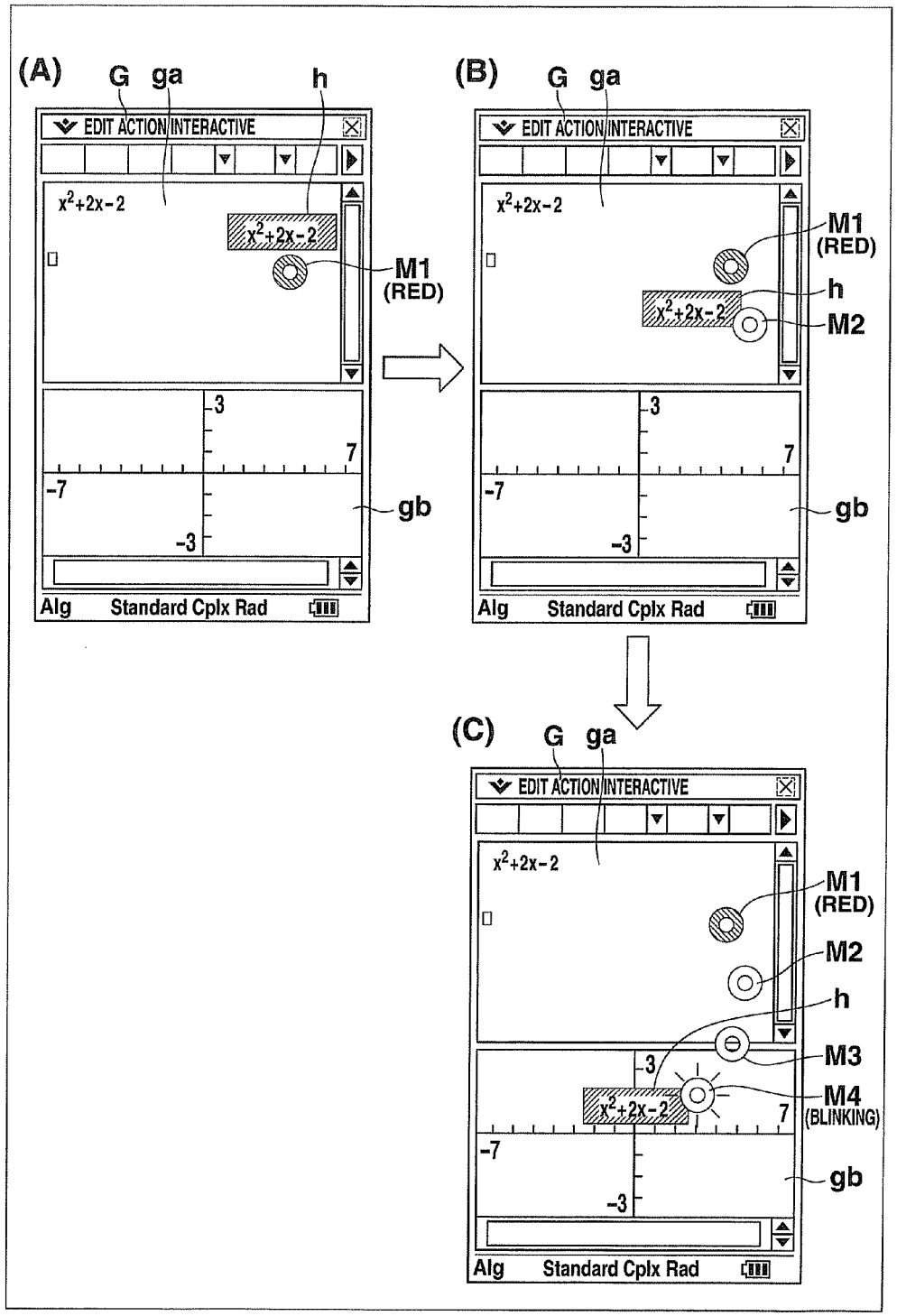
FIG. 5 shows projector display operations (concrete example 2) of the calculator screen G corresponding to a touch operation on the touch-panel graph function electronic calculator 10.

FIG. 5 shows projector display operations (concrete example 2) of the calculator screen G in the graph display application on the graph function electronic calculator 10. In the graph display application, when a mathematical expression input to the expression input area ga is dragged to the graph display area gb, the process of representing the mathematical expression in graph form is performed.

As shown in FIG. 5(A), in the calculator screen G in which the expression input area ga and the graph display area gb are arranged in the vertical direction, if the expression $x^2+2x-2$ in the expression input area ga has been touched, highlighted in reverse display h, and dragged (step S2 and Yes in step S13), it is determined whether the touched object is a "mathematical expression" requiring locus display (step S14).

If it has been determined that it is an object requiring locus display (Yes in step S14), not only is the touch position pointer M1 combined in red with the first touch position of the expression $x^2+2x-2$ and displayed, but also the expression $x^2+2x-2$ is moved and displayed according to the touch position sequentially detected and updated in response to a drag operation as shown in FIG. 5(B)→FIG. 5(C) (step S18) and movement locus pointers M2, M3, M4 are also combined with the expression and displayed at specific intervals of time (or at regular intervals) (step S19). At this time, movement locus pointer M4 corresponding to the latest touch position is displayed so as to be identified by blinking.

After this, the expression $x^2+2x-2$ dragged from the expression input area ga to the graph display area gb is dropped (Yes in step S20), a series of movement locus pointers M1 to M4 combined and displayed in response to the touch and drag operations are displayed and held for a specific time and then deleted (step S21).

Then, a graph corresponding to the expression $x^2+2x-2$ dropped in the graph display area gb is drawn and displayed (steps S22, S5).

As a result, even a student looking at the calculator screen G displayed on the screen 30 by the projector 20 can clearly understand how a locus is drawn when the expression $x^2+2x-2$ in the mathematical expression area ga has been touched by the teacher and dragged to the graph display area gb.

Therefore, with the projector display system of the first embodiment using the touch-panel graph function electronic calculator 10 configured as described above, when the teacher's touch operation T on the touch-panel display module 14 has been detected, touch position pointers Ms, Mt corresponding to objects of the touch operation T or movement locus pointers M1 to Mn are combined with the calculator screens G, Gm, Gk corresponding to current operating conditions and output to the projector 20. As a result, even a student looking at the calculator screens G, Gm, Gk, or the like projected onto the screen 30 can clearly understand the contents of the teacher's touch operations on the touch-panel display module 14 of the graph function electronic calculator 10 (or on calculator screens corresponding to various operations) and then surely understand what the teacher means.

In the projector display system of the first embodiment, touch position pointers Ms, Mt corresponding to objects of the touch operation T or movement locus pointers M1 to Mn are written in the combination data memory 15c and developed in the display data memory 15a, thereby being combined with various calculator screens G, Gm, Gk currently displayed on the touch-panel display module 14. In contrast, touch position pointers Ms, Mt corresponding to objects of the touch operation T or movement locus pointers M1 to Mn may be written directly on various calculator screens G, Gm, Gk developed in the display data memory 15a.

Furthermore, in the projector display system of the first embodiment, the touch-panel graph function electronic calculator 10 itself combines touch position pointers Ms, Mt or movement locus pointers M1 to Mn with a calculator screen and outputs the resulting screen to the projector 20. In contrast, as explained in a projector display system according to a second embodiment below, the touch-panel graph function electronic calculator 10 may output data on objects and coordinates in connection with a touch operation T to the projector 20, which then combines touch position pointers Ms, Mt or movement locus pointers M1 to Mn with a calculator screen and displays the resulting screen.

Second Embodiment

Figure 6:
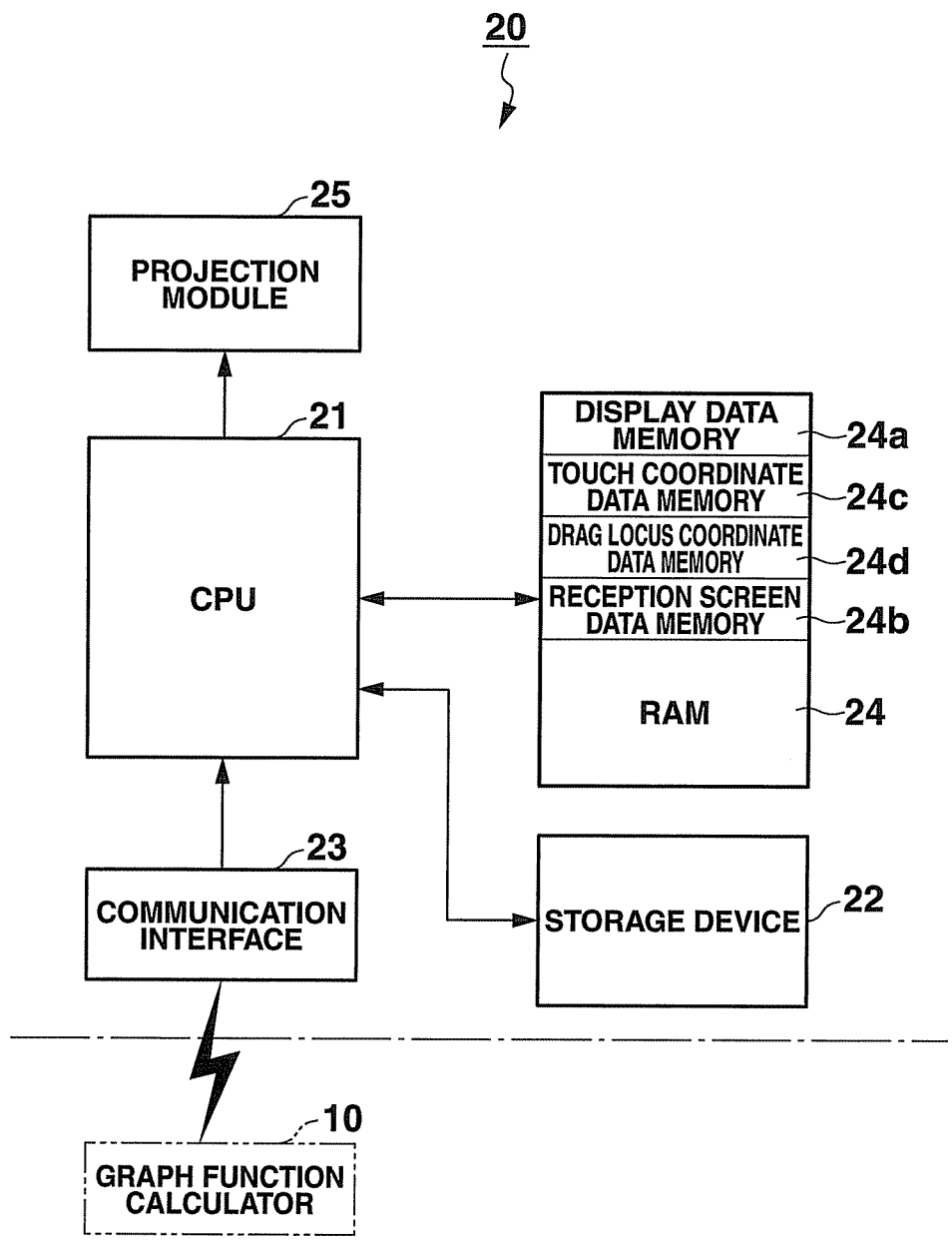
FIG. 6 is a block diagram showing a configuration of the circuitry of a projector 20 used in a projector display system according to a second embodiment of the invention.

FIG. 6 is a block diagram showing a configuration of the electronic circuitry of a projector 20 used in a projector display system according to a second embodiment of the invention.

The projector 20 includes a CPU 21, a computer.

The CPU 21 controls the operation of various parts of the circuitry according to data on a calculator screen received via a communication interface 23 from a touch-panel graph function electronic calculator 10 and data on the coordinates of a touch position and on a touch object corresponding to a teacher's touch operation on the calculator screen on the basis of a projector control program preliminarily stored in a storage device 22 or read from the outside, thereby creating display data to be projected onto a screen 30.

A RAM 24 functioning as a working memory is connected to the CPU 21. Working data corresponding to a control operation of the CPU 21 is stored temporarily in the RAM 24 as needed.

The RAM 24 includes a display data memory 24a, a reception screen data memory 24b, a touch coordinate data memory 24c, and a drag locus coordinate data memory 24d.

In the display data memory 24a, display data to be projected from a projection module 25 onto the screen 30 is developed and stored.

In the reception screen data memory 24b, data on a calculator screen received from the graph function electronic calculator 10 is stored.

In the touch coordinate data memory 24c, coordinate data corresponding to the position of a touch operation T detected at the touch-panel display module 14 of the function electronic calculator 10 is stored.

In the drag locus coordinate data memory 24d, coordinate data corresponding to a locus from the start to end of a change (or a movement) when coordinate data stored in the touch coordinate data memory 24c has changed (or moved) consecutively is stored.

In the projector display system of the second embodiment, the graph function electronic calculator 10 has not only the function of outputting, to the projector 20, data on a calculator screen to be displayed on the touch-panel display module 14 of the function electronic calculator 10 itself but also the function of outputting, to the projector 20, coordinate data on a touch operation position detected at the touch-panel display module 14 and its object data.

Next, an operation of the projector display system of the second embodiment using the touch-panel graph function electronic calculator 10 configured as described above and the projector 20 will be explained.

Figure 7:
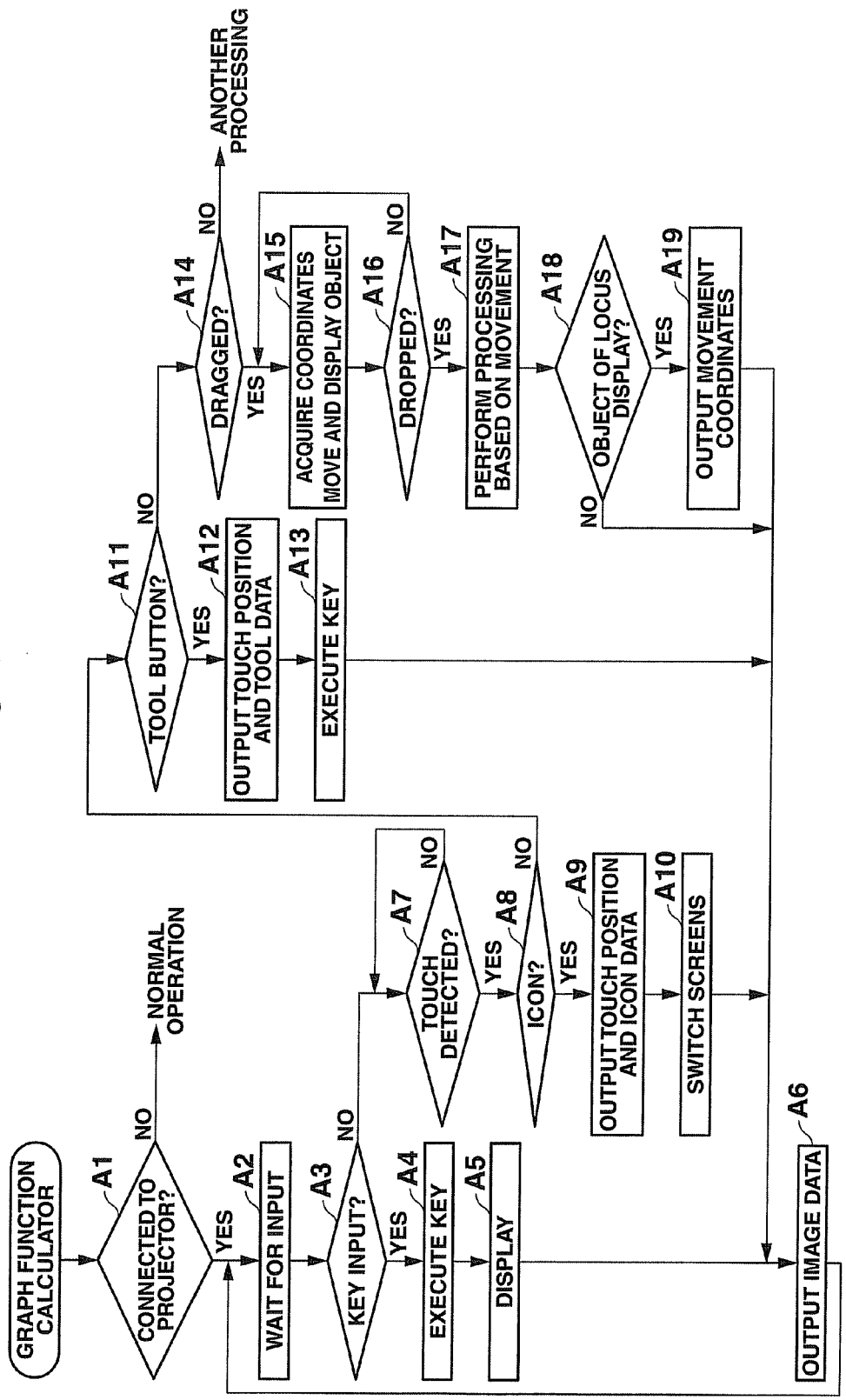
FIG. 7 is a flowchart to explain calculator processing of the second embodiment performed by the touch-panel graph function electronic calculator 10.

FIG. 7 is a flowchart to explain calculator processing of the second embodiment performed by the touch-panel graph function electronic calculator 10.

Figure 8:
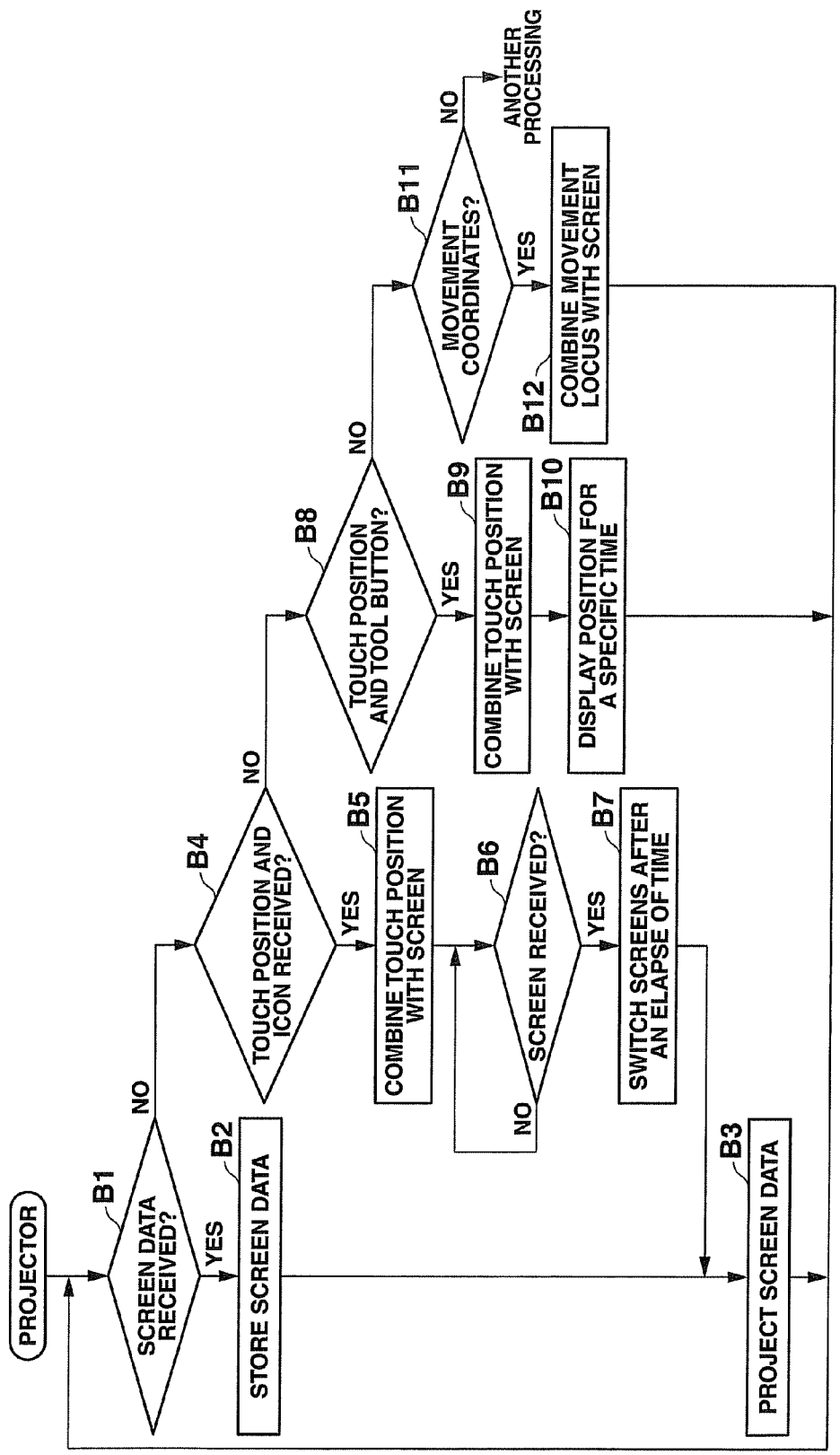
FIG. 8 is a flowchart to explain projector processing of the second embodiment performed by the projector 20.

FIG. 8 is a flowchart to explain projector processing of the second embodiment performed by the projector 20.

When the power supply of the touch-panel graph function electronic calculator 10 has been turned on and the connection of the electronic calculator 10 with the projector 20 has been detected (Yes in step A1), the electronic calculator 10 goes into an input waiting state, waiting for a user operation on a key input module 13 or on the touch-panel display module 14 (step A2).

If a key signal has been input from the key input module 13 (Yes in step A3), an operation corresponding to the input key signal is performed, thereby not only creating a calculator screen G (step A4) and displaying the screen G on the touch-panel display module 14 (step A5) but also outputting the screen G from an output interface 16 to the projector 20 (step A6).

In the projector 20, if the calculator screen G output from the graph function electronic calculator 10 has been received (Yes in step B1), data on the calculator screen G is written in the reception screen data memory 24b and stored there (step B2), and is projected onto the screen 30 via the projection module 25 (step B3).

Specifically, in the graph function electronic calculator 10, for example, when a mathematical expression is key input, the calculator screen G on which the key-input expression is displayed is not only displayed on the touch-panel display module 14 but also output to the projector 20, which projects the calculator screen G onto the screen 30.

On the other hand, in the graph function electronic calculator 10, if a touch has been detected on the touch-panel display module 14 in the input waiting state (step A2), it is determined which display object of the displayed icons, toolbar, figures, and the like has been touched and a process corresponding to the type of the touched object is performed.

As shown in FIG. 4(A), if it has been determined that an arbitrary icon (for example, the graphic processing icon "Geometry") has been touched (step A7 and Yes in step A8) in the input waiting state with the calculator menu screen Gm being displayed (step A2), coordinate data on the position of the touch operation and its object data (icon data) are output to the projector 20 (step A9).

In the projector 20, if coordinate data on the touch position of the graphic processing icon "Geometry" output from the graph function electronic calculator 10 and its object data (icon data) have been received (Yes in step B4), touch position pointer Ms is superimposed on the calculator menu screen Gm developed in the display data memory 24a and projected onto the screen 30 so as to correspond to the coordinates of the touch position (step B5).

Thereafter, in the graph function electronic calculator 10, an operation corresponding to the touched graphic processing icon "Geometry" is performed, thereby not only displaying the graphic processing screen Gk on the touch-panel display module 14 in place of the calculator menu screen Gm (step A10) but also outputting the graphic processing screen Gk to the projector 20 (step A6).

In the projector 20, if the graphic processing screen Gk output from the graph function electronic calculator 10 has been received and the contents of the reception screen data memory 24b have been rewritten (Yes in step B6), when a specific time has elapsed, the contents of the display data memory 24a are also replaced with the same graphic processing screen Gk (step B7), which is then projected onto the screen 30 (step B3).

As a result, even a student looking at the calculator menu screen Gm projected onto the screen 30 can clearly understand that the icon touched by the teacher is the graphic processing icon "Geometry" and then surely understand what the teacher means when the screen has been changed to the graphic processing screen Gk.

Next, in the touch-panel graph function electronic calculator 10, if it has been determined that a tool button (for example, figure selection button Bq) in the toolbar has been touched on the graphic processing screen on which triangle ABC has been displayed (see FIG. 4(B)) (steps A2, A7, and Yes in step A11), the figure selection button Bq is highlighted in reverse display h and coordinate data on the position of the touch operation and its object data (tool data) are output to the projector 20 (step A12).

In the projector 20, if coordinate data on the touch position of the figure selection button Bq output from the graph function electronic calculator 10 and its object data (tool data) have been received (Yes in step B8), touch position pointer P is superimposed on the graphic processing screen Gk developed in the display data memory 24a and projected onto the screen 30 so as to correspond to the coordinates of the touch position (step B9). The touch position is displayed for a specific time (step B10).

Thereafter, in the graph function electronic calculator 10, if an operation corresponding to the touched figure selection button Bq has been performed and selection marks q1, q2, . . . have been attached to the individual sides of triangle ABC currently displayed on the graphic processing screen Gk, respectively (step A13), the updated graphic processing screen Gk is output to the projector 20 (step A6).

Then, in the projector 20, the updated graphic processing screen Gk received from the graph function electronic calculator 10 is projected from the display data memory 24a onto the screen 30, thereby displaying the graphic processing screen Gk on the screen 30 (steps B1, B2, B3).

Here, in the graph function electronic calculator 10, when triangle ABC is copied on the graphic processing screen Gk, if selected triangle ABC is touched and dragged (step A2, Yes in step A14), coordinate data on the touch position detected and updated sequentially according to a drag operation is acquired and triangle DEF copied from triangle ABC according to the update of the coordinate data is created, moved, and displayed (step A15).

Thereafter, as shown in FIG. 4(D), when triangle DEF copied and dragged on the graphic processing screen Gk has been dropped (Yes in step A16), copied triangle DEF is displayed in the dropped position (step A17).

Here, it is determined whether the dragged, dropped, and copied triangle DEF is an object ("mathematical expression" in the second embodiment) that requires locus display (step A18). If it has been determined that triangle DEF is not an object of locus display (No in step A18), display data on the graphic processing screen Gk on which copied triangle DEF has been displayed is output to the projector 20 (step A6), and triangle DEF is projected onto the screen 30, thereby displaying the figure processing screen Gk on the screen 30 (steps B1 to B3).

On the calculator screen G (see FIG. 5(A)) where the expression input area ga and graph display area gb are arranged one above the other, to display, in the graph display area gb, a graph corresponding to the expression $x^2+2x-2$ displayed in the expression input area ga, if the expression $x^2+2x-2$ in the expression input area ga has been touched, highlighted in reverse display h, and dragged (step A2 and Yes in step A14), coordinate data on the touch position detected and updated sequentially according to a drag operation is acquired and the expression $x^2+2x-2$ highlighted in reverse display h according to the update of the coordinate data is moved and displayed in the graph display area gb (step A15).

Thereafter, as shown in FIG. 5(C), if the expression $x^2+2x-2$ dragged on the graph display area gb has been dropped (Yes in step A16), the expression $x^2+2x-2$ is highlighted in reverse display h in the dropped position and then a graph corresponding to the expression $x^2+2x-2$ is drawn and displayed (step A17).

Here, if it has been determined that the object to be dragged is an object requiring locus display, "mathematical expression" (Yes in step A18), coordinate data corresponding to the locus of the drag position acquired in step A15 is output to the projector 20 (A19) and then display data on the calculator screen G on which the expression $x^2+2x-2$ moved to the graph display area gb in step A17 and on its graph have been drawn is output to the projector 20 (step A6).

In the projector 20, if coordinate data resulting from the movement of the expression $x^2+2x-2$ output from the function electronic calculator 10 has been received (Yes in step B11), as shown in FIG. 5(C), movement locus pointers M1, M2, M3, M4 corresponding to movement loci of the touch position according to the individual coordinate data items are superimposed on the calculator screen G currently projected onto the screen 30 (step B12). After this, display data on the calculator screen G on which the expression $x^2+2x-2$ moved to the graph display area gb received from the graph function electronic calculator 10 and its graph have been drawn is projected onto the screen 30, thereby displaying the display data (steps B1 to B3).

Accordingly, with the projector display system of the second embodiment configured as described above, when a teacher's touch operation T on the touch-panel display module 14 of the graph function electronic calculator 10 has been detected, object data on a touch operation corresponding to a current operating state and coordinate data on the touch position are output to the projector 20. In addition, display data on the calculator screens G, Gm changed according to the touch operation is output to the projector 20. Then, in the projector 20, touch position pointer Ms corresponding to an object of the touch operation and movement locus pointers M1 to Mn are superimposed on the calculator screens G, Gm received from the graph function electronic calculator 10 and projected onto the screen 30. Therefore, even a student looking at the calculator screen G, Gm or the like projected onto the screen 30 can clearly understand that the contents of the teacher's touch operation (or calculator screens corresponding to various operations) on the touch-panel display module 14 of the graph function electronic calculator 10 and then easily understand what the teacher means.

In the projector display system of the second embodiment, information on the shape of a pointer or on blinking time when the projector 20 superimposes various pointers Ms, M1 to Mn on a calculator screen may be added to coordinate data on a touch position output from the touch-panel graph function electronic calculator 10 to the projector 20. In this case, pointer shape information may be bitmap data on a pointer itself or code data previously defined according to a shape.

Furthermore, information on the time required to switch from the superimposition of any one of the pointers Ms, M1 to Mn corresponding to coordinate data on a touch position in the projector 20 to the next calculator screen G may be added to coordinate data on the touch position output from the touch-panel graph function electronic calculator 10 to the projector 20.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
   a display module with a touch-panel;
   a processor configured to:
   determine a connection with an external display device;
   determine whether an object displayed on the display module has been touched and dragged by a user without releasing the object;
   move the object depending on a drag operation;
   combine image data of display entity displaying an initial touched position and image data of display entity displaying a midway position of movement of a mutually different aspect with display screen data so as to identify the display entity displaying the initial touched position and the display entity displaying the midway position of movement by the drag operation of the display entities representing the object has been dragged when connected to the external display device by a mutually different aspect on a dragged locus for a constant time after the drag operation; and
   output the combined display screen data to the external display device.

2. The electronic device of claim 1, wherein the processor determines whether the dragged object requires a locus display, and
   combines the image data of the display entities with the display screen data for a specific time if the locus display is required.

3. The electronic device of claim 1, wherein the processor combines image data of a display entity, of the display entities, representing a touch with the display screen data so as to display a touch position when the touch is detected in the touch-panel, and
   output the display screen data combined with image data of the display entities representing the touch position to the external display device.

4. The electronic device of claim 3, wherein the processor switches to subsequent display screen data based on an execution of an operation after a specific time has elapsed since the combination of the image data of the display entities representing the touch and the display screen data when an object displayed in the touched position is to instruct to execute the operation.

5. A method of displaying in an electronic device including a display module with a touch-panel, the method comprising steps of:
   determining a connection with an external display device;
   determining whether an object displayed in the display module has been touched and dragged by a user without releasing the object;
   moving the object depending on a drag operation;
   combining image data of display entity displaying an initial touched position and image data of display entity displaying a midway position of movement of a mutually different aspect with a display screen data so as to identify the display entity displaying the initial touched position and the display entity displaying the midway position of movement by the drag operation of the display entities representing the object has been dragged by mutually different aspect when connected to the external display device on a dragged locus for a constant time after the drag operation; and
   outputting the combined display screen data to the external display device.

6. The method of claim 5, further comprising the steps of:
   determining whether the dragged object requires a locus display; and combining the image data of the display entities with the display screen data for a specific time if the locus display is required.

7. The method of claim 5, further comprising the step of:

combining image data of display entities, of the display entities, representing a touch with the display screen data so as to display a touch position when the touch is detected in the touch-panel; and outputting the display screen data combined with image data of the display entities representing the touch position to the external display device.

8. The method of claim 7, further comprising the step of:

switching to subsequent display screen data based on an execution of an operation after a specific time has elapsed since the combination of the image data of display entities representing a touch with the display screen data when the object displayed in the touched position is to instruct to execute the operation.

* * * * *